US012409856B2

United States Patent
Jafari et al.

(10) Patent No.: US 12,409,856 B2
(45) Date of Patent: Sep. 9, 2025

(54) AUTONOMOUS DRIVING SYSTEM FOR CREATING A PLANNED ROUTE BASED ON MESSAGES DISPLAYED BY ROAD SIGNS

(71) Applicant: GM Global Technology Operations LLC, Detroit, MI (US)

(72) Inventors: Rouhollah Sayed Jafari, Troy, MI (US); Alireza Esna Ashari Esfahani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 18/295,967

(22) Filed: Apr. 5, 2023

(65) Prior Publication Data
US 2024/0336281 A1  Oct. 10, 2024

(51) Int. Cl.
*H04W 4/44* (2018.01)
*B60W 50/00* (2006.01)
(Continued)

(52) U.S. Cl.
CPC .... *B60W 60/0011* (2020.02); *B60W 50/0097* (2013.01); *G06V 20/582* (2022.01); *G06V 20/588* (2022.01); *H04W 4/44* (2018.02); *B60W 2420/403* (2013.01); *B60W 2552/53* (2020.02); *B60W 2555/60* (2020.02); *B60W 2556/35* (2020.02); *B60W 2556/40* (2020.02); *B60W 2556/45* (2020.02)

(58) Field of Classification Search
CPC ......... B60W 60/0011; B60W 50/0097; B60W 2552/53; B60W 2556/40; B60W 2556/45; B60W 2555/60; B60W 2556/35; B60W 2420/403; H04W 4/44; G06V 20/582; G06V 20/588

USPC .......................................................... 701/23
See application file for complete search history.

(56) References Cited

U.S. PATENT DOCUMENTS 10,339,398 B2 *   7/2019   Fotta ................... G06V 20/582
2018/0232967 A1 *  8/2018   Segawa .................. H04N 7/188
(Continued)

FOREIGN PATENT DOCUMENTS

EP           2017807 A1 *   1/2009   ......... G08G 1/09626

OTHER PUBLICATIONS

Sign Classification, Jul. 3, 2015, Transportation Engineering Agency (Year: 2015).*

*Primary Examiner* — Ramya P Burgess
(74) *Attorney, Agent, or Firm* — Vivacqua Crane, PLLC

(57) ABSTRACT

An autonomous driving system for a vehicle includes one or more controllers that execute instructions to monitor image data captured by one or more cameras. In response to detecting a road sign in the image data, the controllers interpret a message displayed by the road sign. The controllers classify the message conveyed by the road sign into a sign application class based on a time frame when the message conveyed by the road sign is applicable. In response to determining the message conveyed by the road sign is classified as a future traffic condition encountered by the vehicle, the controllers identify lane segments having one or more updated lane attributes that are impacted by the message of the road sign and determine a planned route based on the one or more updated lane attributes of the lane segments impacted by the message displayed by the road sign.

17 Claims, 4 Drawing Sheets

(51) Int. Cl.
  *B60W 60/00*    (2020.01)
  *G06V 20/56*    (2022.01)
  *G06V 20/58*    (2022.01)

(56) References Cited

U.S. PATENT DOCUMENTS

2019/0212163 A1\* 7/2019 Li .................... G01C 21/3837
2021/0012527 A1\* 1/2021 Shu .................... G06N 3/045
2022/0402520 A1\* 12/2022 Hetang .............. G01C 21/3602

\* cited by examiner

AUTONOMOUS DRIVING SYSTEM FOR CREATING A PLANNED ROUTE BASED ON MESSAGES DISPLAYED BY ROAD SIGNS

INTRODUCTION

The present disclosure relates to an autonomous driving system for a vehicle that creates a planned route based on interpreting messages displayed by a road sign, where the interpreted messages are indicative of future traffic conditions encountered by the vehicle.

An autonomous vehicle executes various tasks such as, but not limited to, perception, localization, mapping, path planning, decision making, and motion control. For example, an autonomous vehicle may include perception sensors such as a camera for collecting image data regarding the environment surrounding the vehicle. The autonomous vehicle may include a road sign interpretation system that relies on various algorithms for interpreting the information conveyed by a road sign. For example, scene text recognition (STR) algorithms and natural language processing algorithms may be used for semantic understanding of the text displayed by the road sign. In another approach, the road sign interpretation system may rely on perceptual hashing techniques to interpret the information conveyed by a road sign.

Some types of road signs do not include specific text or symbols containing explicit instructions for the road vehicles to follow at the present time. Instead, some road signs are informative and contain information informing users of various traffic conditions that may occur in the future. That is, in other words, many road signs do not indicate which maneuver a vehicle is currently supposed to execute, and instead provide information about upcoming traffic conditions the vehicle may encounter ahead. Some examples of providing information regarding upcoming traffic conditions include, but are not limited to, a road sign indicating construction is ahead, a road sign including a left turn only lane marking, or a road sign indicating a road closure ahead.

Additionally, some road signs may convey instructions that are to be carried out until some condition is fulfilled, or until the vehicle encounters the next relevant road sign. For example, a speed limit road sign is applicable until the vehicle encounters the next speed limit road sign while traveling. It is to be appreciated that the route planner of an autonomous driving system determines a lane-level route for a host vehicle to follow based on the information extracted from the road signs. However, it may be challenging for the route planner to utilize the information extracted from road signs that include information regarding upcoming traffic conditions, or that convey instructions that are to be carried out until some condition is satisfied when determining a planned route.

Thus, while autonomous vehicles achieve their intended purpose, there is a need in the art for an improved approach for utilizing information determined by a road sign interpretation system when determining a planned route.

SUMMARY

According to several aspects, an autonomous driving system for a vehicle is disclosed, and includes one or more cameras capturing image data of a surrounding environment of the vehicle, where the surrounding environment includes a road sign. The autonomous driving system also includes one or more controllers in electronic communication with the one or more cameras, where the one or more controllers receive perception data and map data. The one or more controllers execute instructions to monitor the image data captured by the one or more cameras. In response to detecting the road sign in the image data, the one or more controllers interpret a message displayed by the road sign. The one or more controllers classify the message conveyed by the road sign into a sign application class based on a time frame when the message conveyed by the road sign is applicable. In response to determining the message conveyed by the road sign is classified as a future traffic condition encountered by the vehicle, the controllers identify lane segments having one or more updated lane attributes that are impacted by the message of the road sign, where the lane segments are part of a lane graph structure in the map data. The one or more controllers determine a planned route based on the one or more updated lane attributes of the lane segments impacted by the message displayed by the road sign.

In another aspect, the controllers classify the message conveyed by the road sign into one of three sign application classes.

In yet another aspect, the three sign application classes include a present class, an application ahead, an application until expired class.

In an aspect, the application until expired class is indicative of future traffic conditions the vehicle encounters.

In another aspect, identifying the lane segments having the one or more updated lane attributes impacted by the message displayed by the road sign includes analyzing regulation-based standards.

In yet another aspect, the regulation-based standards include maintenance work zone traffic control guidelines.

In an aspect, identifying the lane segments having the one or more updated lane attributes impacted by the message displayed by the road sign includes identifying the lane segments preceding an upcoming road feature within the lane graph structure potentially impacted by the message displayed by the road sign.

In another aspect, identifying the lane segments having the one or more updated lane attributes impacted by the message displayed by the road sign includes analyzing image data captured by the one or more cameras.

In yet another aspect, the image data includes visual cues in a surrounding environment of the vehicle indicating a lane attribute of at least one of the lane segments is potentially impacted by the message displayed by the road sign.

In an aspect, identifying the lane segments having the one or more updated lane attributes impacted by the message displayed by the road sign includes analyzing vehicle-to-everything (V2X) data.

In another aspect, identifying the lane segments having the one or more updated lane attributes impacted by the message displayed by the road sign includes fusing together results from analyzing the regulation-based standards, the map data, the perception data, and the V2X data.

In yet another aspect, the one or more controllers execute instructions to identify a location within the lane graph structure where the message conveyed by the road sign expires.

In an aspect, the one or more updated lane attributes indicate one of the following: when a particular lane segment is mapped or unmapped in the lane graph structure, the presence of construction, when the particular lane segment is authorized to be included in a selected route, and when the particular lane segment includes the same direction of travel as the vehicle.

In another aspect, a method of determining a planned route by an autonomous driving system for a vehicle is disclosed. The method includes monitoring, by one or more controllers, image data captured by one or more cameras, where the one or more cameras capture the image data of a surrounding environment of the vehicle that includes a road sign. In response to detecting the road sign in the image data, the method includes interpreting a message displayed by the road sign. The method also includes classifying the message conveyed by the road sign into a sign application class based on a time frame when the message conveyed by the road sign is applicable. In response to determining the message conveyed by the road sign is classified as a future traffic condition encountered by the vehicle, the method includes identifying lane segments having one or more updated lane attributes that are impacted by the message of the road sign, where the lane segments are part of a lane graph structure in map data. Finally, the method includes determining a planned route based on the one or more updated lane attributes of the lane segments impacted by the message displayed by the road sign.

In another aspect, an autonomous driving system for a vehicle is disclosed, and includes one or more cameras capturing image data of a surrounding environment of the vehicle, where the surrounding environment includes a road sign. The autonomous driving system also includes one or more controllers in electronic communication with the one or more cameras, where the one or more controllers receive perception data and map data. The one or more controllers execute instructions to monitor the image data captured by the one or more cameras. In response to detecting the road sign in the image data, the controllers interpret a message displayed by the road sign. The one or more controllers classify the message conveyed by the road sign into one of three sign application classes based on a time frame when the message conveyed by the road sign is applicable, where the three sign application classes include a present class, an application ahead, and an application until expired class. In response to determining the message conveyed by the road sign is classified as either the application ahead or the application until expired class, the one or more controllers identify lane segments having one or more updated lane attributes that are impacted by the message of the road sign, where the lane segments are part of a lane graph structure in the map data. The one or more controllers determine a planned route based on the one or more updated lane attributes of the lane segments impacted by the message displayed by the road sign.

In another aspect, identifying the lane segments having the one or more updated lane attributes impacted by the message displayed by the road sign includes analyzing regulation-based standards.

In yet another aspect, identifying the lane segments having the one or more updated lane attributes impacted by the message displayed by the road sign includes identifying the lane segments preceding an upcoming road feature within the lane graph structure potentially impacted by the message displayed by the road sign.

In an aspect, identifying the lane segments having the one or more updated lane attributes impacted by the message displayed by the road sign includes analyzing image data captured by one or more cameras in electronic communication with the one or more controllers.

In another aspect, identifying the lane segments having the one or more updated lane attributes impacted by the message displayed by the road sign includes analyzing V2X data.

In yet another aspect, identifying the lane segments having the one or more updated lane attributes impacted by the message displayed by the road sign includes fusing together results from analyzing the regulation-based standards, the map data, the perception data, and the V2X data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
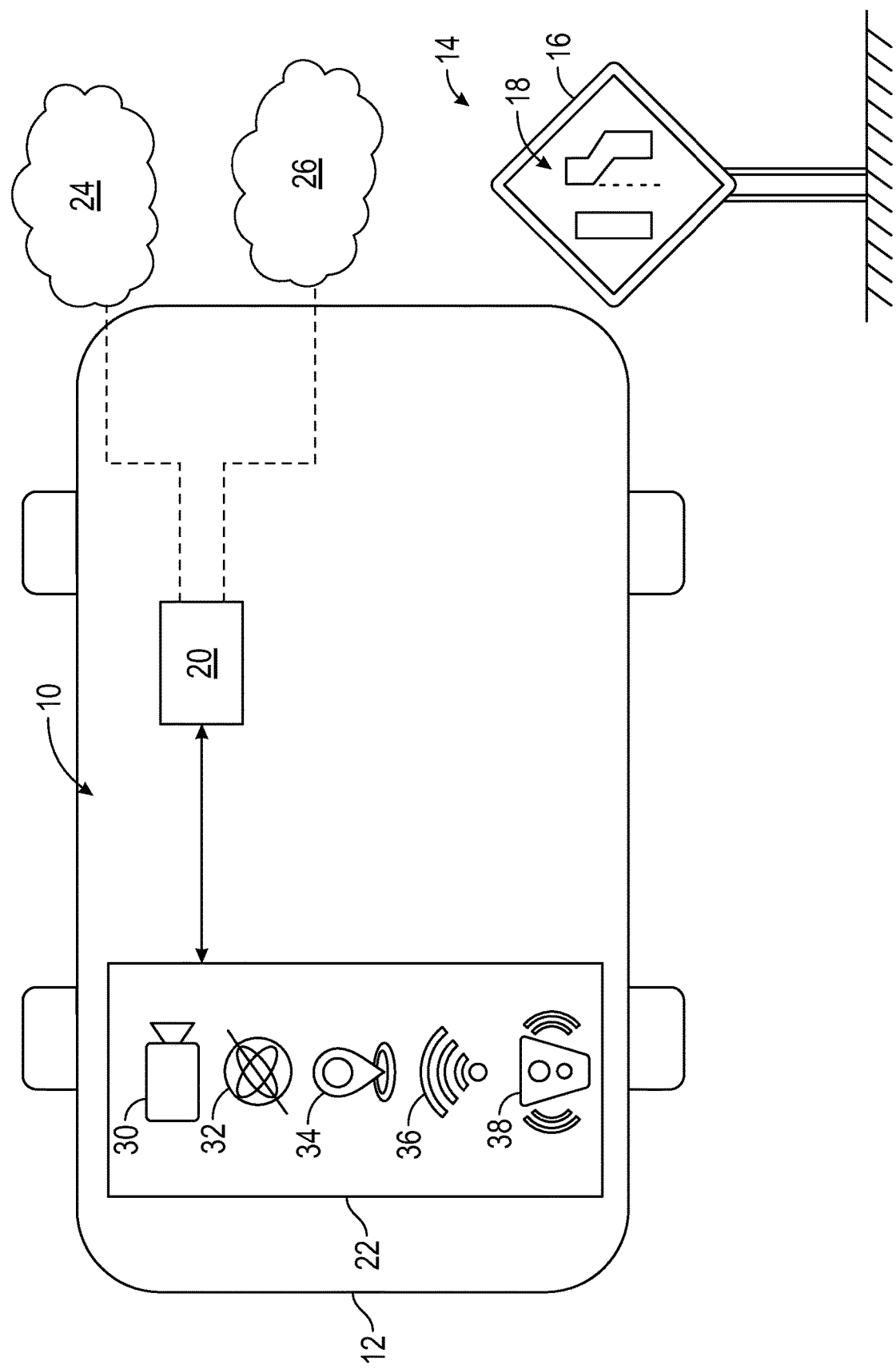
FIG. 1 is a schematic diagram of a vehicle including the disclosed autonomous driving system including one or more controllers, according to an exemplary embodiment.

Referring to FIG. 1, an exemplary autonomous driving system 10 for a vehicle 12 is illustrated. It is to be appreciated that the vehicle 12 may be any type of vehicle such as, but not limited to, a sedan, truck, sport utility vehicle, van, or motor home. In one embodiment, the autonomous driving system 10 is part of an automated driving system (ADS) or an advanced driver assistance system (ADAS) for assisting a driver with steering, braking, and/or accelerating. The autonomous driving system 10 includes one or more controllers 20 in electronic communication with a plurality of perception sensors 22. The plurality of perception sensors 22 includes one or more cameras 30, an inertial measurement unit (IMU) 32, a global positioning system (GPS) 34, radar 36, and LIDAR 38, however, is to be appreciated that additional sensors may be used as well. The one or more controllers 20 are also in wireless communication with one or more communication networks 24 to obtain map data and a vehicle-to-everything (V2X) communication network 26 to obtain information regarding one or more entities surrounding the vehicle 12. The entities surrounding the vehicle 12 include, for example, other vehicles, infrastructure, and electronic devices located in the surrounding environment 14. Some examples of infrastructure include traffic control devices, and some examples of electronic devices include smartphones.

The one or more controllers 20 receive image data of a surrounding environment 14 of the vehicle 12 from the one or more cameras 30. The one or more controllers 20 monitor the image data captured by the one or more cameras 30 for a road sign 16 located in the surrounding environment 14 of the vehicle 12. The road sign 16 is erected at the side of or above a road to provide information to the road users and displays one or more messages 18. The message 18 includes text, symbols, or both text and symbols to convey information to the road users. In an embodiment, the road sign 16 is informative and conveys information about upcoming traffic conditions the vehicle 12 encounters ahead or in the future. In the example as shown in FIG. 1, the road sign 16 displays a message 18 that is a symbol indicating the right lane ends ahead, however, it is to be appreciated that FIG. 1 is merely exemplary in nature.

Figure 2:
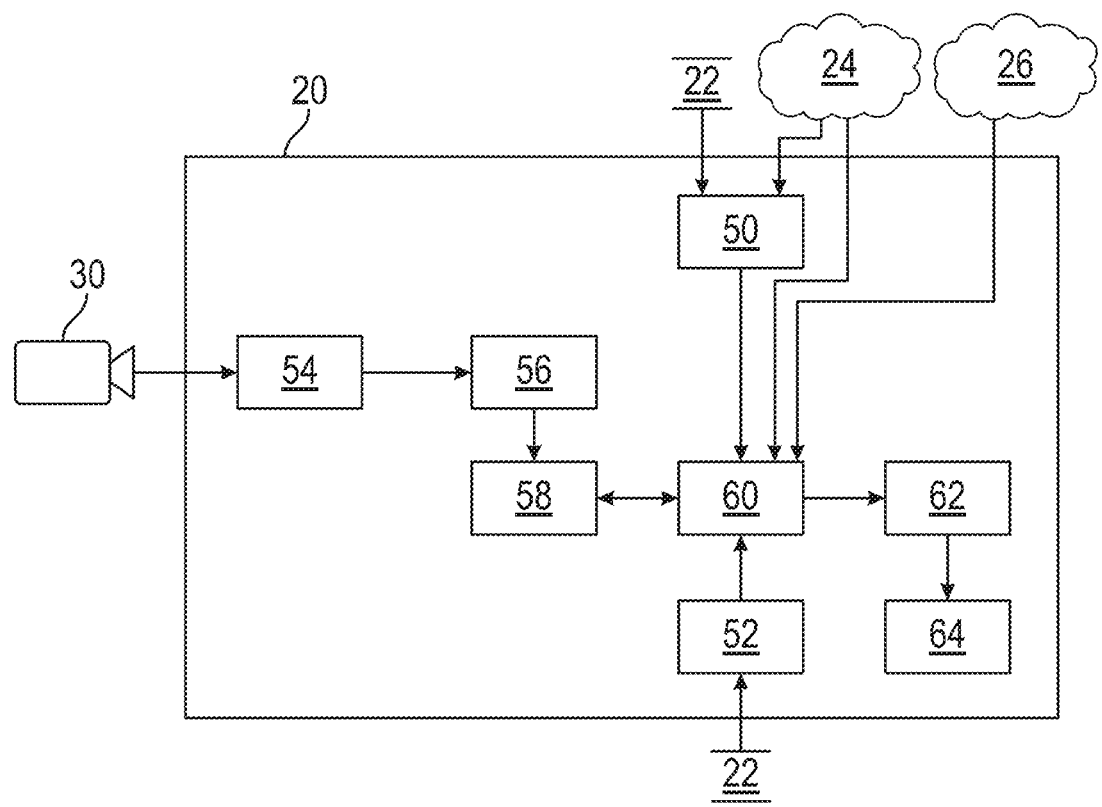
FIG. 2 is a block diagram illustrating the software architecture for converting road sign messages into a planned route by the one or more controllers shown in FIG. 1, according to an exemplary embodiment.

FIG. 2 is a block diagram of the software architecture for converting road sign messages into the planned route by the one or more controllers 20 shown in FIG. 1. The one or more controllers 20 include a localization module 50, a perception module 52, a sign interpretation module 54, a classification module 56, a memory update module 58, a map association module 60, a lane attribute update module 62, and a route planning module 64. Referring to both FIGS. 1 and 2, the localization module 50 receives data from the perception sensors 22 and the map data from the network 24 and determines a current position of the vehicle 12 relative to the surrounding environment 14 based on the data from the perception sensors 22 and the map data. The perception module 52 receives the data from the plurality of perception sensors 22 and determines perception data based on the data received from plurality of perception sensors 22.

The sign interpretation module 54 of the one or more controllers 20 monitors the image data captured by the one or more cameras 30 for the road sign 16 located in the surrounding environment 14 of the vehicle 12. In response to detecting the road sign 16 in the image data, the sign interpretation module 54 of the one or more controllers 20 interprets the message 18 displayed by the road sign 16 based on any number of techniques such as, for example, scene text recognition (STR) algorithms and natural language processing algorithms for semantic understanding of the text displayed by the road sign or, in the alternative, perceptual hashing techniques.

The sign interpretation module 54 of the one or more controllers 20 sends the interpreted message 18 of the road sign 16 to the classification module 56. The classification module 56 classifies the interpreted message 18 conveyed by the road sign 16 into a sign application class based on a time frame when the message 18 conveyed by the road sign 16 is applicable. As explained below, the message 18 conveyed by the road sign 16 is analyzed to determine an impact on attributes associated with specific lane segments 92 (FIG. 4) of a lane graph structure 90 that is part of the map data in response to determining the message 18 conveyed by the road sign 16 is classified as being applicable to future traffic conditions encountered by the vehicle 12.

In an embodiment, the interpreted message 18 conveyed by the road sign 16 is classified into one of three sign application classes. The first sign application class is referred to as a present class, where the interpreted message 18 conveyed by the road sign 16 is applied at the current location where the vehicle 12 (FIG. 1) is located. Some examples of road signs 16 that are applied at the current location where the vehicle 12 is located include, but are not limited to, stop signs and yield signs. The second sign application class is referred to as an application ahead, where the interpreted message 18 conveyed by the road sign 16 is indicative of future traffic conditions and is applied at a location ahead of the current location where the vehicle 12 is located. In other words, the application ahead indicates the interpreted message 18 conveyed by the road sign 16 is to be applied in the future. Some examples of road signs 16 that are executed at a location ahead of the current location include, but are not limited to, road signs indicating road construction is located ahead and road signs indicating a lane is about to end. The third sign application class is referred to as an application until expired class, where the interpreted message 18 conveyed by the road sign 16 is applied until a predetermined condition no longer applies. It is to be appreciated that the application until expired class is indicative of future traffic conditions the vehicle 12 encounters. Some examples of road signs 16 that are applied until expired include, but are not limited to, road signs indicating the speed limit and do not pass road signs.

The memory update module 58 receives the interpreted message 18 of the road sign 16 and the sign application class associated with the interpreted message 18, and filters and updates the interpreted messages 18 that are sent to the map association module 60 based on the sign application class. Specifically, the memory update module 58 filters interpreted messages 18 that are classified as the present class and removes them from consideration by the map association module 60. In response to determining the interpreted message 18 of the road sign 16 is classified as either the application ahead or the application until expired class, the memory update module 58 sends the interpreted message 18 of the road sign 16 to the map association module 60 and stores the interpreted message 18 of the road sign 16 in memory of the one or more controllers 20.

Figure 3:
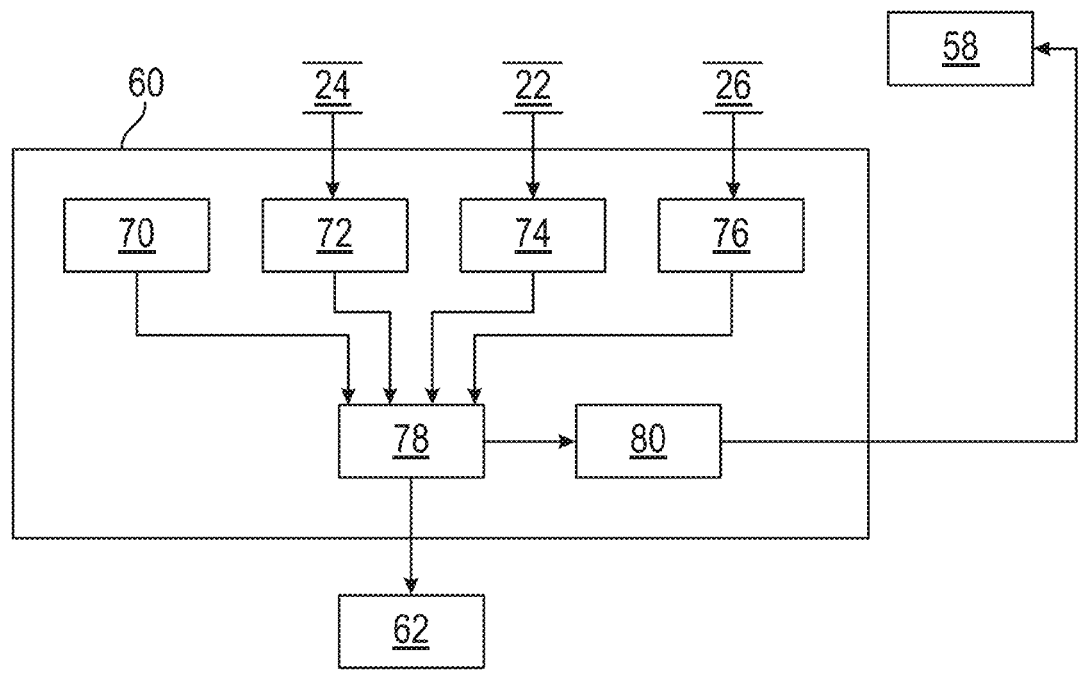
FIG. 3 is a block diagram of a map association module that is part of the one or more controllers shown in FIG. 2, according to an exemplary embodiment.

The map association module 60 receives the map data from the network 24, the V2X data received over the network 26, the interpreted message 18 of the road sign 16, the current location of the vehicle 12 from the localization module 50, and perception data from the perception module 52. FIG. 3 is a block diagram of the map association module 60 shown in FIG. 2. The map association module 60 includes a regulation-based block 70, a map-based block 72, a perception-based block 74, a V2X block 76, a lane association block 78, and an expiration block 80. As explained below, the regulation-based block 70, the map-based block 72, the perception-based block 74, and the V2X block 76 of the map association module 60 identify one or more lane segments 92 (FIG. 4) having one or more updated lane attributes 96 that are impacted by the message 18 of the road sign 16 stored in the memory of the one or more controllers 20 based on various sources of information.

Figure 4:
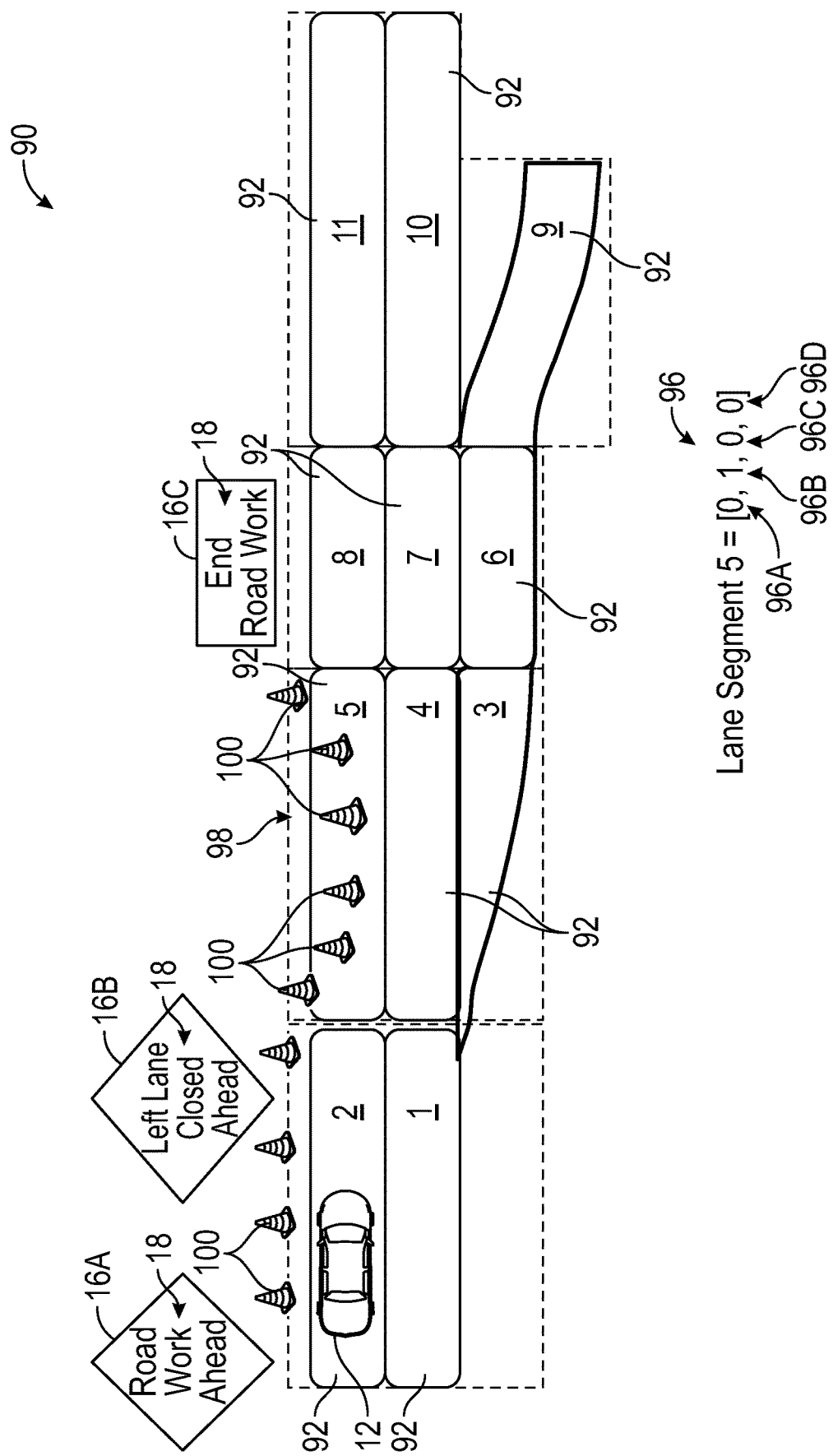
FIG. 4 illustrates a lane graph structure including a plurality of lane segments, according to an exemplary embodiment.

Referring to FIG. 4, the lane attributes 96 refer to characteristics of a particular lane segment 92. In one non-limiting embodiment the lane attributes 96 indicate characteristics such as, for example, when a particular lane segment 92 is mapped or unmapped in the lane graph structure 90, the presence of construction, when the particular lane segment 92 is authorized to be included in the selected route generated by the route planning module 64, and when the particular lane segment 92 includes the same direction of travel as the vehicle 12, however, it is to be appreciated that different or additional lane attributes may be included as well. In the example as shown in FIG. 4, the lane attribute 96 indicates the characteristics for lane segment 5, where the lane graph structure 90 illustrates lane segments 1-11. FIG. 4 illustrates four lane attributes 96A-96D, where a "0" denotes an absence of the specific lane attribute 96 and a "1" denotes the presence of the specific lane attribute 96. In the example as shown, the "0" for the lane attribute 96A indicates the lane segment 5 is mapped in the lane graph structure 90, the "1" for lane attribute 96B indicates the presence of construction, the "0" for lane attribute 96C indicates lane segment 5 is authorized to be on a selected route determined by the route planning module 64, and the "0" for lane attribute 96D indicates the direction of travel of lane segment 5 is the same as the vehicle 12. FIG. 4 also illustrates three road signs 16A, 16B, and 16C, where the first road sign 16A includes the message "Road work ahead", the second road sign 16B includes the message "Left lane closed ahead", and the third road sign 16C includes the message "End road work".

Referring to both FIGS. 3 and 4, the regulation-based block 70 of the map association module 60 provides information to identify one or more lane segments 92 having a lane attribute 96 potentially impacted by the message 18 of the road sign 16 based on analyzing regulation-based standards. In an embodiment, the regulation-based standards include maintenance work zone traffic control guidelines, which dictate a construction distance measured between the road sign 16A that indicates the presence of the construction site 98 and the location of the construction site 98. It is to be appreciated that other types of regulation-based standards that indicate a set of rules that regulate the location where the road signs 16 are installed may be used as well. For example, other regulation-based standards may indicate the distance measured between a road sign and an intersection (e.g., a road sign displaying the message "right lane must turn right" is installed at a specific distance from an intersection). The maintenance work zone traffic control guidelines stipulate the construction distance measured between the first road sign 16A informing the road users of the construction site 98 and the location of the construction site 98, and in one non-limiting example may range from about 0.5 to about 1 mile (0.8 to 1.61 kilometers). In the present example, the regulation-based block 70 of the map association module 60 identifies the lane segments 92 located within the construction distance from the first road sign 16A, which may include lane segments 3, 4, and 5. As explained below, the lane association block 78 fuses together the output from the regulation-based block 70, the map-based block 72, the perception-based block 74, and the V2X block 76 to identify the specific lane segments 92 having one or more lane attributes 96 that are impacted by the message 18 of the road sign 16 stored in the memory of the one or more controllers 20.

Referring to FIG. 3, the map-based block 72 of the map association module 60 identifies one or more lane segments having a lane attribute 96 potentially impacted by the message 18 of the road sign 16 based on analyzing the map data received from the network 24 (FIG. 1). For example, if the message 18 displayed by the road sign 16 displays "Right lane must turn right", then the map-based block 72 analyzes the map data to identify the lane segments 92 preceding an upcoming road feature within the lane graph structure 90 potentially impacted by the message 18 displayed by the road sign 16. Some examples of upcoming road features include, but are not limited to, exits, intersections, roundabouts, or parking locations. In the example as shown in FIG. 4, the upcoming road feature is a right exit, and the map-based block 72 would identify lane segment 6, which precedes a right exit, as the lane segment 92 potentially impacted by the message "Right lane must turn right".

Referring to FIG. 3, the perception-based block 74 of the map association module 60 identifies one or more lane segments 92 having a lane attribute 96 potentially impacted by the message 18 displayed by the road sign 16 based on analyzing the perception data collected by the plurality of perception sensors 22 (FIG. 1). Specifically, the perception-based block operates by identifying clues that may aid in specifying where the message 18 displayed by the road sign 16 is applied. In an embodiment, the perception-based block 74 analyzes the image data captured by the one or more cameras 30 (FIG. 1), where the image data includes visual cues in the surrounding environment 14 of the vehicle 12 that indicate a lane attribute 96 of at least one of the lane segments 92 is potentially impacted by the message 18 displayed by the road sign 16. In the example as shown in FIG. 4, the image data captured by the one or more cameras 30 indicate road construction cones 100 located at lane segment 5. Furthermore, the image data also indicates traffic merging in lane segment 2 to avoid the road construction cones 100 located in lane segment 5. Also, the image data include the message 18 displayed by the second road sign 16B (i.e., "Left lane closed ahead").

Finally, the V2X block 76 of the map association module 60 identifies one or more lane segments 92 having a lane attribute 96 potentially impacted by the message 18 displayed by the road sign 16 based on analyzing V2X data received over the network 26 (FIG. 1). In the example as shown in FIG. 4, the V2X data indicates that surrounding vehicles report the location of the construction site 98. For example, in one embodiment, the V2X data indicates the distance measured between the vehicle 12 (FIG. 1) and the construction site 98 is about 0.7 miles (1.13 kilometers), which includes lane segments 3, 4 and 5.

The lane association block 78 of the map association module 60 fuses together the output from the regulation-based block 70, the map-based block 72, the perception-based block 74, and the V2X block 76 to identify the lane segments 92 having one or more updated lane attributes 96 that are impacted by the message 18 of the road sign 16 stored in the memory of the one or more controllers 20. In the example as shown in FIGS. 3 and 4, the regulation-based block 70 of the map association module 60 identifies lane segments 3, 4, and 5 as being potentially impacted, and the perception-based block 74 and the V2X block 76 both indicate lane segment 5 as being potentially impacted. Therefore, in the present example, the lane association block 78 identifies lane segment 5 as having one or more updated lane attributes 96 impacted by the message 18 displayed by the road sign 16. The lane association block 78 of the map association module 60 then transmits the lane segments 92 having one or more updated lane attributes 96 that are impacted by the message 18 to the lane attribute update module 62.

The expiration block 80 of the map association module 60 monitors the output from the regulation-based block 70, the map-based block 72, the perception-based block 74, and the V2X block 76 to identify a location within the lane graph structure 90 where the message 18 of the road sign 16 stored in the memory of the one or more controllers 20 is no longer applicable or expires. In the example as shown in FIG. 4, the expiration block 80 of the map association module 60 determines the message 18 displayed by the road sign 16A (road work ahead) expires after lane segment 5. This is because the perception data indicates the third road sign 16C includes the message "End road work". The perception data also indicates that the road construction cones 100 end after lane segment 5. Furthermore, the perception data also indicates that traffic is present on road segment 8. In response to determining the message 18 displayed by the road sign 16A is no longer applicable, the expiration block 80 sends a notification to the memory update module 58 to remove the message 18 of the road sign 16A from memory of the one or more controllers 20.

Referring to FIGS. 2 and 4, the lane attribute update module 62 of the one or more controllers 20 receives the lane segments 92 having one or more updated lane attributes 96 that are impacted by the message 18 from the map association module 60. The lane attribute update module 62 updates the lane attributes associated with the message 18 conveyed by road sign 16 for the lane segments 92 received from the map association module 60. For example, in the embodiment shown in FIG. 4, the lane attribute 96B associated with construction status on lane segment 5 is updated to 1.

The route planning module 64 determines a planned route the vehicle 12 follows based on the lane segments 92 having one or more updated lane attributes 96 that are impacted by the message 18. Specifically, in an embodiment, the planned route is a lane-level path the vehicle 12 follows. The route planning module 64 may include or exclude the lane segments 92 that are impacted by the message 18 displayed by the road sign 16 when determining the planned route. For example, in the embodiment as shown in FIG. 4, the route planning module 64 may determine the planned route the vehicle 12 follows by avoiding travel along lane segment 5. As another example, if the message 18 displayed by the road sign 16 reads "Right lane must turn right" but the planned route includes having the vehicle 12 travel in a straight direction along a road, then the route planning module 64 may include lane segment 6 (FIG. 4), which precedes a right exit, when determining the planned route for the vehicle 12. In response to determining the message 18 displayed by the road sign 16 is no longer applicable, the road sign 16 may be removed from the memory of the one or more controllers 20. In the example as shown in FIG. 4, once the road sign 16C (End road work) is detected and the vehicle 12 passes the construction site 98, the road sign 16C is removed from the memory of the one or more controllers 20. As another example, if the message 18 states "Right lane must turn right", the road sign 18 will be removed from the memory as vehicle 12 passes an exit lane (lane segment 9).

Figure 5:
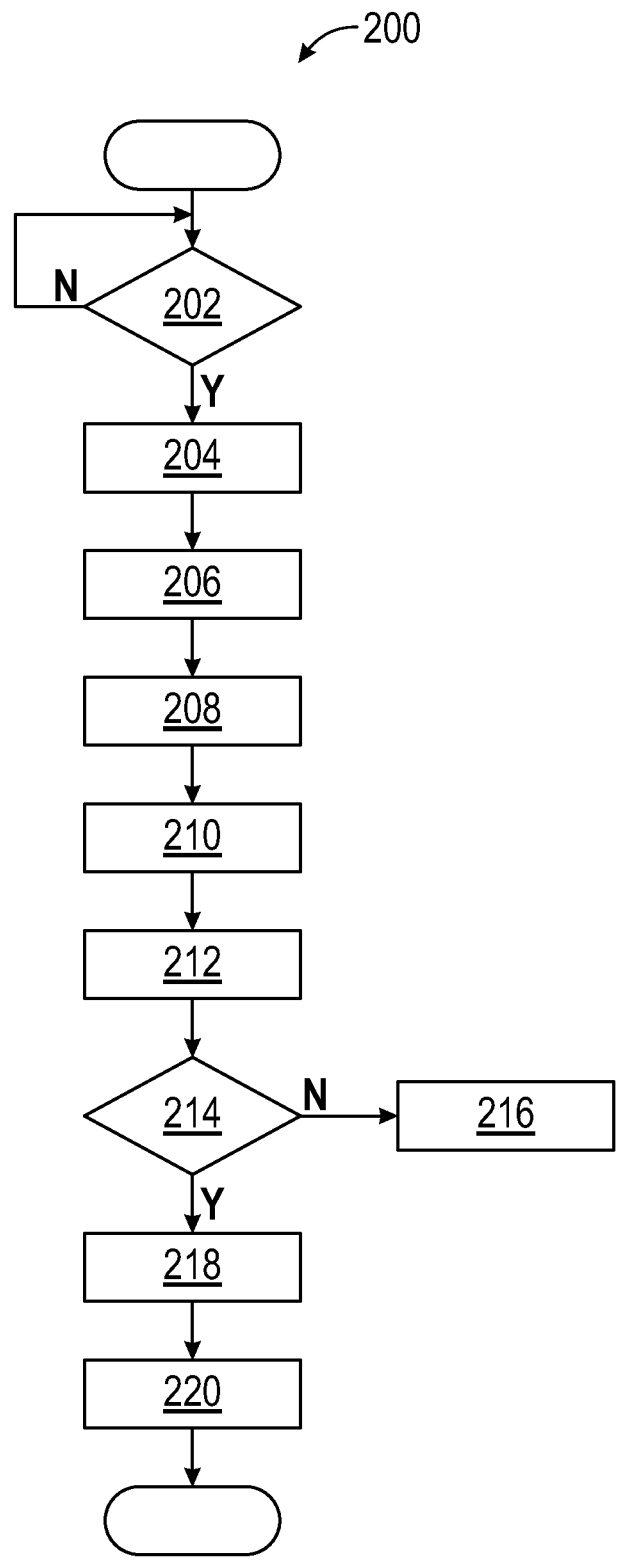
FIG. 5 is a process flow diagram illustrating a method for determining a planned route by the autonomous driving system illustrated in FIG. 1, according to an exemplary embodiment.

FIG. 5 is an exemplary process flow diagram illustrating a method 200 for determining the planned route the vehicle 12 follows based on the lane segments 92 that are impacted by the message 18 displayed by the road sign 16. Referring generally to FIGS. 1-5, the method 200 may begin at decision block 202. In decision block 202, the sign interpretation module 54 of the one or more controllers 20 continues to monitor the image data captured by the one or more cameras 30 for the road sign 16 located in the surrounding environment 14 of the vehicle 12 until detecting a road sign 16 in the image data. The method 200 may then proceed to block 204.

In block 204, in response to detecting the road sign 16 in the image data, the sign interpretation module 54 of the one or more controllers 20 interpret the message 18 displayed by the road sign 16. The method 200 may then proceed to block 206.

In block 206, the classification module 56 classifies the message 18 conveyed by the road sign 16 into a sign application class based on a time frame when the message 18 conveyed by the road sign 16 is applicable. The method 200 may then proceed to block 208.

In block 208, the memory update module 58 filters interpreted messages 18 that are classified as the present class and removes them from consideration by the map association module 60. In response to determining the interpreted message 18 of the road sign 16 is classified as either the application ahead or the application until expired class, the memory update module 58 sends the interpreted message 18 of the road sign 16 to the map association module 60 and stores the interpreted message 18 of the road sign 16 in memory of the one or more controllers 20. The method 200 may then proceed to block 210.

In block 210, in response to determining the message 18 conveyed by the road sign 16 is classified as a future traffic condition encountered by the vehicle 12, the map association module 60 identifies the lane segments 92 (FIG. 4) having one or more updated lane attributes 96 impacted by the message 18 of the road sign 16. The lane association block 78 of the map association module 60 fuses together the results from analyzing the regulation-based standards, the map data, the perception data, and the V2X data to identify the lane segments 92 having one or more lane attributes 96 impacted by the message 18 of the road sign 16. The method 200 may then proceed to block 212.

In block 212, the expiration block 80 of the map association module 60 continues to monitor the results from analyzing the regulation-based standards, the map data, the perception data, and the V2X data to identify a location within the lane graph structure 90 where the message 18 of the road sign 16 stored in the memory of the one or more controllers 20 expires. The method 200 may then proceed to decision block 214.

In decision block 214, if the message 18 of road sign 16 is determined to be expired, then the method 200 proceeds to block 216, where the road sign 16 stored in the memory of the one or more controllers 20 is removed. The method 200 may then terminate. Referring to decision block 214, in response to determining the lane segments 92 identified by the map association module 60 are affected by the road sign 16 saved in the memory of the one or more controllers 20, the method 200 proceeds to block 218. In block 218, the lane attribute update module 62 may then update the lane attributes associated with the message 18 displayed by the road sign 16 for the lane segments 92, which are then sent to the route planning module 64. The method 200 may proceed to block 220.

In block 220, the route planning module 64 determines the planned route based on the lane segments 92 having one or more updated lane attributes 96 that are impacted by the message 18. The method 200 may then terminate.

Referring generally to the figures, the disclosed autonomous driving system provides various technical effects and benefits. Specifically, the disclosure provides an approach for utilizing information collected while interpreting road signs when determining a planned route for an autonomous vehicle. In particular, the autonomous driving system utilizes messages displayed by road signs that are classified as future traffic conditions encountered by the vehicle when determining the planned route for automated driving.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An autonomous driving system for a vehicle, comprising:
   one or more cameras capturing image data of a surrounding environment of the vehicle, wherein the surrounding environment includes a road sign; and
   one or more controllers in electronic communication with the one or more cameras, wherein the one or more controllers receive perception data and map data, and wherein the one or more controllers execute instructions to:
   monitor the image data captured by the one or more cameras;
   in response to detecting the road sign in the image data, interpret a message displayed by the road sign;
   classify the message conveyed by the road sign into a sign application class based on a time frame when the message conveyed by the road sign is applicable, wherein the sign application class includes a present class, an application ahead class, an application until expired class, and wherein the present class applies the message conveyed by the road sign at a current location where the vehicle is located, the application ahead class is indicative of future traffic conditions and is applied at a location ahead of the current location where the vehicle is located, and the application until expired class is indicative of future traffic conditions the vehicle encounters;
   in response to determining the message conveyed by the road sign is classified as the present class, filter and remove the message from consideration;
   in response to determining the message conveyed by the road sign is classified as either the application ahead class or the application until expired class encountered by the vehicle, identify lane segments having one or more updated lane attributes that are impacted by the message of the road sign, wherein the lane segments are part of a lane graph structure in the map data;
   determine a planned route based on the one or more updated lane attributes of the lane segments impacted by the message displayed by the road sign; and
   follow, by the vehicle, the planned route determined by the autonomous driving system.

2. The autonomous driving system of claim 1, wherein identifying the lane segments having the one or more updated lane attributes impacted by the message displayed by the road sign includes analyzing regulation-based standards.

3. The autonomous driving system of claim 2, wherein the regulation-based standards include maintenance work zone traffic control guidelines.

4. The autonomous driving system of claim 2, wherein identifying the lane segments having the one or more updated lane attributes impacted by the message displayed by the road sign includes:
   identifying the lane segments preceding an upcoming road feature within the lane graph structure potentially impacted by the message displayed by the road sign.

5. The autonomous driving system of claim 2, wherein identifying the lane segments having the one or more updated lane attributes impacted by the message displayed by the road sign includes:
   analyzing image data captured by the one or more cameras.

6. The autonomous driving system of claim 5, wherein the image data includes visual cues in a surrounding environment of the vehicle indicating a lane attribute of at least one of the lane segments is potentially impacted by the message displayed by the road sign.

7. The autonomous driving system of claim 5, wherein identifying the lane segments having the one or more updated lane attributes impacted by the message displayed by the road sign includes analyzing vehicle-to-everything (V2X) data.

8. The autonomous driving system of claim 7, wherein identifying the lane segments having the one or more updated lane attributes impacted by the message displayed by the road sign includes:
   fusing together results from analyzing the regulation-based standards, the map data, the perception data, and the V2X data.

9. The autonomous driving system of claim 5, wherein the one or more controllers execute instructions to:
   identify a location within the lane graph structure where the message conveyed by the road sign expires.

10. The autonomous driving system of claim 1, wherein the one or more updated lane attributes indicate one of the following: when a particular lane segment is mapped or unmapped in the lane graph structure, the presence of construction, when the particular lane segment is authorized to be included in a selected route, and when the particular lane segment includes the same direction of travel as the vehicle.

11. A method of determining a planned route by an autonomous driving system for a vehicle, the method comprising:
   monitoring, by one or more controllers, image data captured by one or more cameras, wherein the one or more cameras capture the image data of a surrounding environment of the vehicle that includes a road sign;
   in response to detecting the road sign in the image data, interpreting a message displayed by the road sign;
   classifying the message conveyed by the road sign into a sign application class based on a time frame when the message conveyed by the road sign is applicable, wherein the sign application class includes a present class, an application ahead class, an application until expired class, and wherein the present class applies the message conveyed by the road sign at a current location where the vehicle is located, the application ahead class is indicative of future traffic conditions and is applied at a location ahead of the current location where the vehicle is located, and the application until expired class is indicative of future traffic conditions the vehicle encounters;
   in response to determining the message conveyed by the road sign is classified as the present class, filtering and removing the message from consideration;
   in response to determining the message conveyed by the road sign is classified as either the application ahead class or the application until expired class encountered by the vehicle, identifying lane segments having one or more updated lane attributes that are impacted by the message of the road sign, wherein the lane segments are part of a lane graph structure in map data;

determining a planned route based on the one or more updated lane attributes of the lane segments impacted by the message displayed by the road sign; and following, by the vehicle, the planned route determined by the autonomous driving system.

12. An autonomous driving system for a vehicle, comprising:

one or more cameras capturing image data of a surrounding environment of the vehicle, wherein the surrounding environment includes a road sign; and one or more controllers in electronic communication with the one or more cameras, wherein the one or more controllers receive perception data and map data, and wherein the one or more controllers execute instructions to:

monitor the image data captured by the one or more cameras;

in response to detecting the road sign in the image data, interpret a message displayed by the road sign;

classify the message conveyed by the road sign into one of three sign application classes based on a time frame when the message conveyed by the road sign is applicable, wherein the three sign application classes include a present class, an application ahead class, and an application until expired class, and wherein the present class applies the message conveyed by the road sign at a current location where the vehicle is located, the application ahead class is indicative of future traffic conditions and is applied at a location ahead of the current location where the vehicle is located, and the application until expired class is indicative of future traffic conditions the vehicle encounters;

in response to determining the message conveyed by the road sign is classified as the present class, filter and remove the message from consideration;

in response to determining the message conveyed by the road sign is classified as either the application ahead or the application until expired class, identify lane segments having one or more updated lane attributes that are impacted by the message of the road sign, wherein the lane segments are part of a lane graph structure in the map data and the one or more updated lane attributes indicate one of the following: when a particular lane segment is mapped or unmapped in the lane graph structure, the presence of construction, when the particular lane segment is authorized to be included in a selected route, and when the particular lane segment includes the same direction of travel as the vehicle;

determine a planned route based on the one or more updated lane attributes of the lane segments impacted by the message displayed by the road sign; and follow, by the vehicle, the planned route determined by the autonomous driving system.

13. The autonomous driving system of claim 12, wherein identifying the lane segments having the one or more updated lane attributes impacted by the message displayed by the road sign includes analyzing regulation-based standards.

14. The autonomous driving system of claim 13, wherein identifying the lane segments having the one or more updated lane attributes impacted by the message displayed by the road sign includes:

identifying the lane segments preceding an upcoming road feature within the lane graph structure potentially impacted by the message displayed by the road sign.

15. The autonomous driving system of claim 14, wherein identifying the lane segments having the one or more updated lane attributes impacted by the message displayed by the road sign includes:

analyzing image data captured by one or more cameras in electronic communication with the one or more controllers.

16. The autonomous driving system of claim 15, wherein identifying the lane segments having the one or more updated lane attributes impacted by the message displayed by the road sign includes analyzing V2X data.

17. The autonomous driving system of claim 16, wherein identifying the lane segments having the one or more updated lane attributes impacted by the message displayed by the road sign includes:

fusing together results from analyzing the regulation-based standards, the map data, the perception data, and the V2X data.

* * * * *